(No Model.) 3 Sheets—Sheet 2.

I. L. LANDIS & A. ISKE.
COMBINED HAY RAKE AND TEDDER.

No. 398,165. Patented Feb. 19, 1889.

Witnesses,
John S. Finch Jr.
C. D. Davis.

Inventors
Israel L. Landis
Albert Iske
By their Attorney
C. M. Alexander (No Model.) 3 Sheets—Sheet 3.
I. L. LANDIS & A. ISKE.
COMBINED HAY RAKE AND TEDDER.
No. 398,165. Patented Feb. 19, 1889.
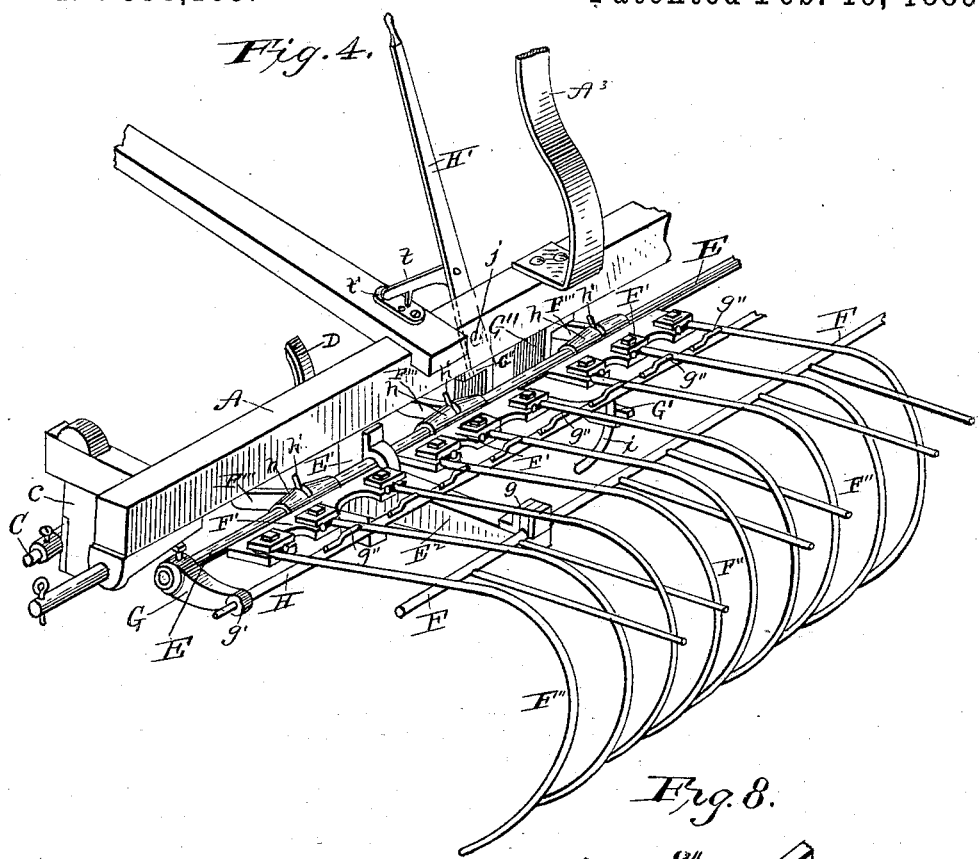
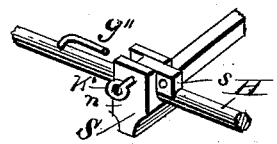
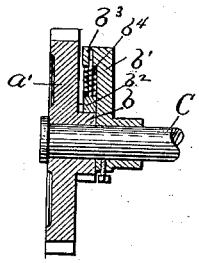
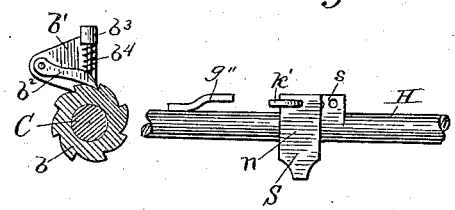
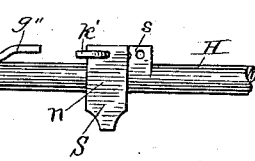
Witnesses,
John T. Finick Jr.
C. D. Davis
Inventors,
Israel L. Landis
and Albert Iske
By their Attorney
C. M. Alexander

UNITED STATES PATENT OFFICE.

ISRAEL L. LANDIS AND ALBERT ISKE, OF LANCASTER, PENNSYLVANIA; SAID ISKE ASSIGNOR TO SAID LANDIS.

COMBINED HAY RAKE AND TEDDER.

SPECIFICATION forming part of Letters Patent No. 398,165, dated February 19, 1889.

Application filed October 3, 1887. Serial No. 251,330. (No model.)

*To all whom it may concern:*

Be it known that we, ISRAEL L. LANDIS and ALBERT ISKE, citizens of the United States, residing at Lancaster, in the county of Lancaster and State of Pennsylvania, have invented certain new and useful Improvements in a Combined Hay Rake and Tedder, of which the following is a specification, reference being had therein to the accompanying drawings.

This invention relates to novel improvements in what are denominated "combined hay rakes and tedders;" and it consists, mainly, in certain devices by means of which the tappet-bearing rod and the hooked engaging-rod can be operated by a single lever, giving these rods endwise movements in opposite directions, thus interchangeably converting the machine from a rake to a tedder, and vice versa, at the will of the driver without moving from his seat; also, in providing novel means whereby the hook-bearing rod can be positively locked, whether it be adjusted for tedding or raking.

The invention also consists in certain other novel features of construction and arrangement of parts, which will be fully hereinafter pointed out and claimed.

These improvements will be fully understood from the following description and claims, taken in connection with the annexed drawings, in which—

Figure 1:
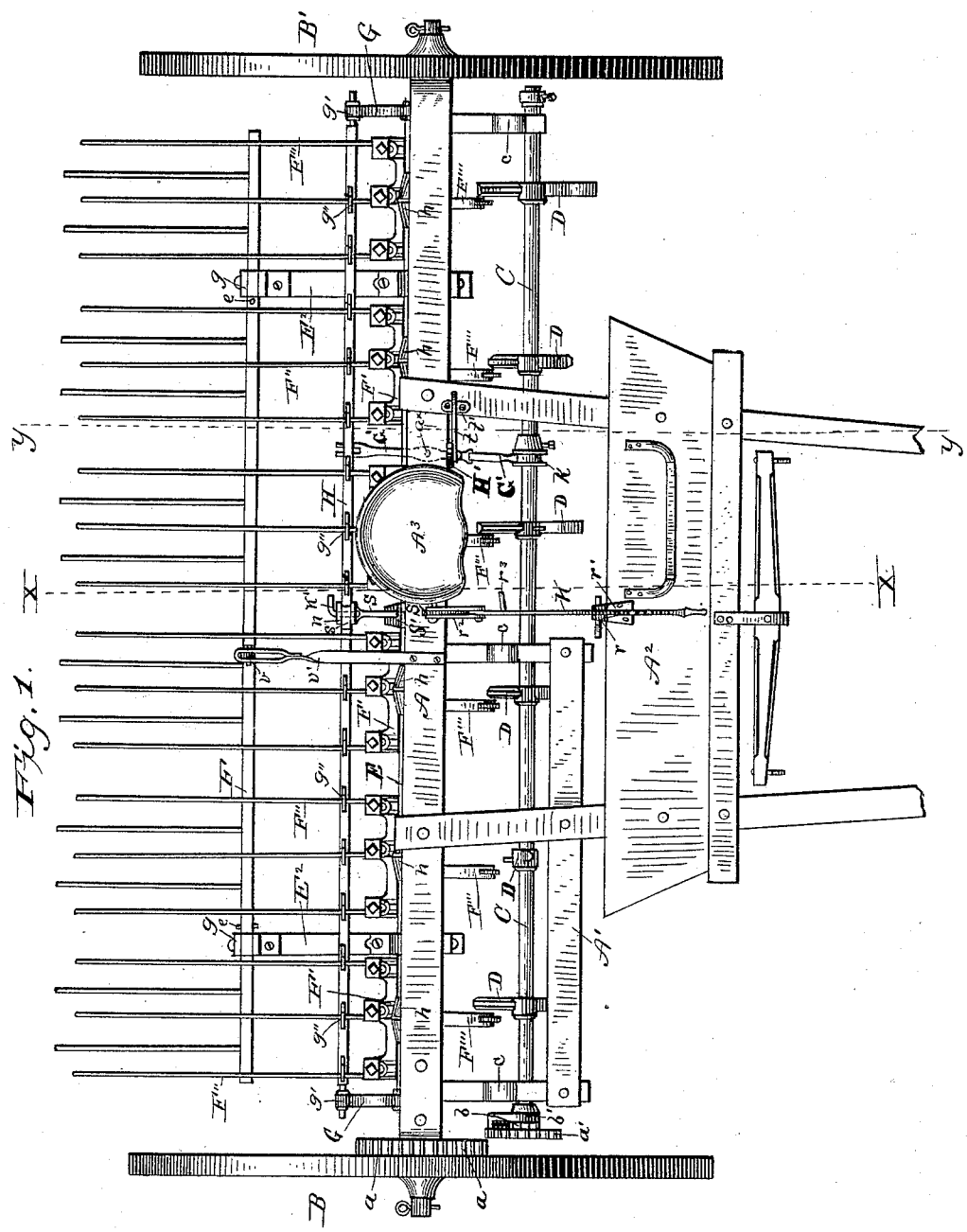
Figure 2:
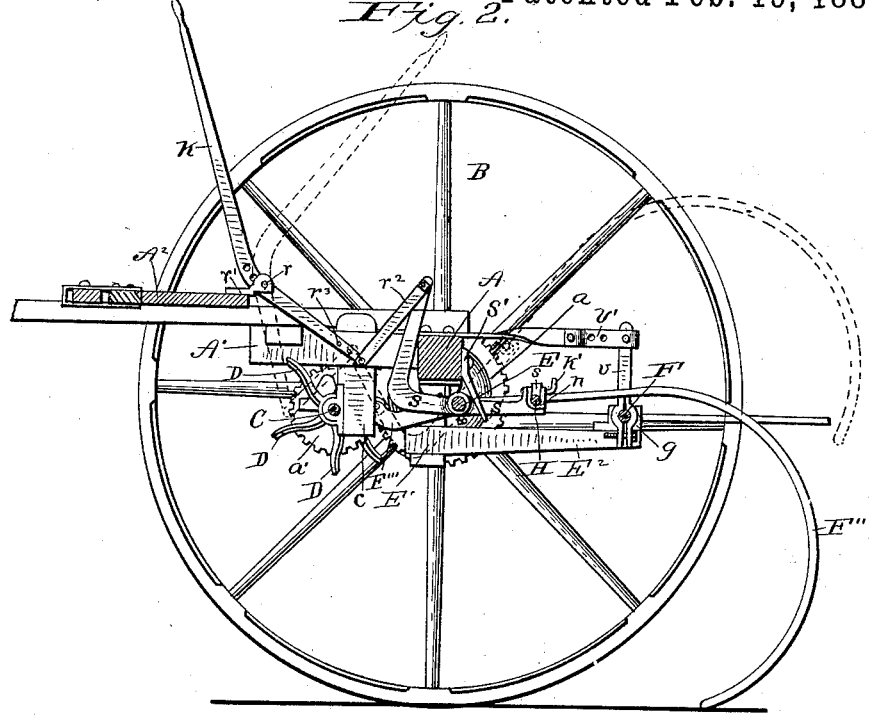
Figure 3:
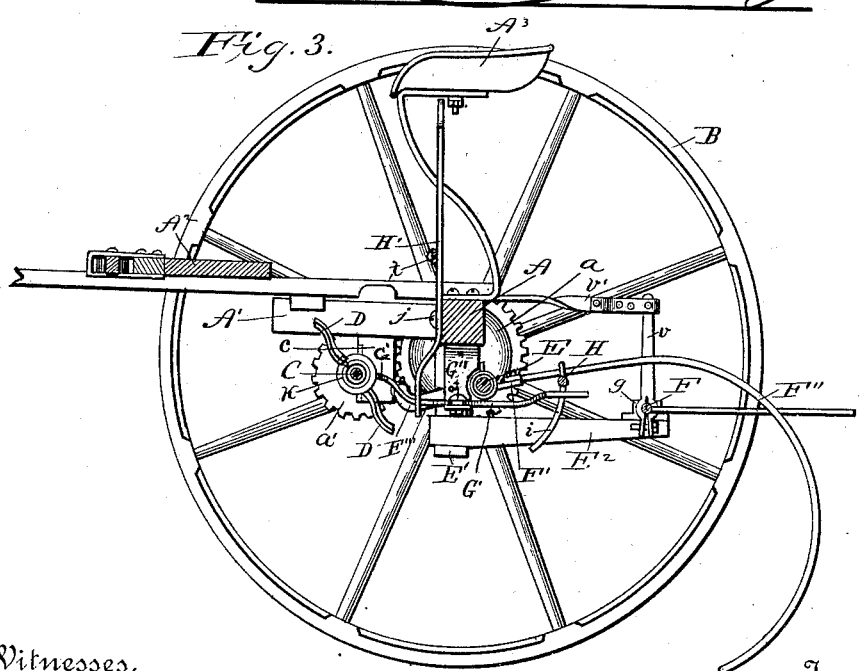

Figure 1 is a plan view of my combined hay rake and tedder, showing the machine adjusted for raking. Fig. 2 is a vertical longitudinal section through the machine in the plane indicated by dotted line $x\ x$ on Fig. 1. Fig. 3 is a similar section taken in the plane $y\ y$ indicated on Fig. 1. Fig. 4 is a perspective detail showing clearly the bearers at one end of the machine for the tappet and hook bearing rods, rake-heads, and the hand-lever, with its locking-hook and connection with the hook-bearing rod. Fig. 5 is a diametrical section through the pinion and ratchet on the end of the tappet-shaft, showing the spring-actuated pawl. Fig. 6 is a vertical cross-section showing the peculiar construction of this engaging device. Fig. 7 is a view in detail for the purpose of clearly showing how the hook-bearing rod is locked to the knee-lever of the hand-lever for the purpose of positively holding the machine as a rake or a tedder. Fig. 8 is a perspective detail showing more clearly the device for locking the hook-bearing rod to its actuating-lever.

Referring to the annexed drawings by letter, A designates the axle of the machine, from which projects a frame, A', rigidly secured to it, and to which the thills are rigidly secured, as clearly shown in Fig. 1. The said frame A' projects from the front of the axle A, and is on one side only of the middle of the length thereof, for the purpose of affording an auxiliary support for the thills in advance of the axle and to secure lightness of construction.

On the thills is secured a foot-board, $A^2$, for the driver, whose position is on the seat $A^3$, mounted upon the axle A. In front of this foot-board and secured to the thills is a cross-bar, to which the singletree is suitably attached. Secured to the ends of the axle A are spindles, on which the transporting-wheels B B' are applied. The wheel B is a driving-wheel, and has rigidly secured to its hub a spur-wheel, $a$, the inner edges of the teeth of which are preferably slightly beveled. This wheel is thus adapted to readily engage with a pinion spur-wheel, $a'$, which is applied loosely on a tappet-rod, C, and provided with a ratchet-hub, $b$. (Shown in Figs. 5 and 6.)

In close relation to the inner end of the ratchet-hub $b$ and keyed on the tappet-rod C is an arm, $b'$, to which is pivoted a pawl, $b^2$. This arm is constructed with a sheath-offset, $b^3$, which receives a stud fixed to the said pawl, and between the sheath and pawl a spring, $b^4$, is coiled about the stud. By means of this device the grass or hay is not liable to interfere with the proper movement of the tappet-rod. This tappet-rod is journaled in hangers $c\ c'$, depending from the frame and axle. On this rod are adjustably secured by set-screws tappet-arms D, the object of which will be hereinafter explained.

E designates the rake-head rod. This rod has no endwise movement. It articulates about its longitudinal axis in bearings E', depending at right angles from and rigidly secured to the axle A. From these bearings protrude backwardly arms E², on the rear ends of which are boxes g, which afford bearings for the head F of the clearing-tines.

It will be observed that the head F is allowed a slight endwise play, resisted only by the pins e, and that the caps of these boxes are readily removable.

On the ends of the rake-head are rigidly secured, by set-screws or in any other suitable manner, arms G G, which extend backward and have long eye-bearers g' formed on their rear ends. Through these bearers g' pass freely the reduced ends of an endwise-movable rod, H, on which are fixed a number of hooks, g'', all directed toward the driving-wheel B'.

On the rake-head rod E we apply the heads F', which are practically clamps for the several gangs of teeth. Each head F' has secured to it one or more tines, F'', and these heads may be constructed as represented in the drawings, or in any other suitable manner. The thimbles h of the heads are slotted and play freely on the rod E, and through the slots of the thimbles pass pins h', as shown in Fig. 4, which are fixed into said rod, and which not only serve as guides, but they prevent endwise movements of the rake-heads.

From each thimble of a rake-head projects an arm, F''', to the upturned portion of which is pivoted an anti-friction roller, against which the tappets impinge in their rotation when the tines are adjusted for tedding.

It has above been shown that the tappet-rod and the rod provided with hooks are endwise adjustable in their bearings. We will now describe why we make these two rods adjustable and how it is done.

G' designates a lever, which is fulcrumed at $a^x$ in a stirrup, G'', rigidly fixed to and depending from the axle A. The rear bifurcated end of this lever receives through it a curved guiding and thrust arm, i, which is rigidly secured to the rod H.

The forwardly-projecting limb of the lever G' is received freely in an annularly-grooved collar, k, which is secured by a set-screw on the tappet-rod, as clearly shown in Fig. 1 of the annexed drawings. Between the forward end of the said lever G' and its fulcrum it is straddled by the lower bifurcated end of a hand-lever, H', which lever is fulcrumed on the front side of the axle A at j, and its upper end is in a convenient position to the driver when in his seat. Now it will be seen from the foregoing that when the lever H' is moved to the left the tappet-rod is moved to the right and the pinion a' is caused to engage with the driving spur-wheel a on the hub of the transporting ground-wheel; also, that by this movement the tappets on said shaft are brought into alignment with the anti-friction rollers on the forward ends of the arms which project from the several rake-heads. Simultaneously with this movement of the hand-lever H' the rod H, bearing the hooks, is moved toward the left-hand side of the machine and all the hooks are detached from the tines. The rake-heads are thus free to be oscillated on their shaft, and the machine is now converted into a tedder.

By moving the hand-lever H' toward the right-hand side of the machine the tappets are adjusted out of alignment with the arms on the rake-heads, and simultaneously therewith the rod bearing the hooks is moved endwise to the right and the hooks are all engaged with the tines. The machine is now converted into a rake.

K designates a bent hand-lever, which is fulcrumed at r to a bracket, r', secured upon the foot-board. This lever is in close relation to the driver's seat, and its rear arm is pivoted to links $r^2$ and provided with a treadle-pin, $r^3$. The upper ends of the said links $r^2$ are pivoted to a knee-lever, S, which is secured to the rake-head rod and guided by a vertically-slotted guide-arm, S', fixed to the back of the axle A. The rear extension of the knee-lever S has a broad transversely and vertically slotted head, n, formed integral with it, longitudinally through which passes a pin, k', which is designed, when in place, to pass through one of several holes through an upward flat extension, s, rigid with the hook-bearing rod H. By means of this fastening the hook-bearing rod can be positively held in a position for holding the rake-teeth engaged with the hooks on said rod.

It will be observed that by means of the knee-lever S, secured at its rear end to the rod H, the rake-teeth may be raised, as shown in dotted lines in Fig. 2, the knee-lever being operated by the lever K, as is evident.

It will be observed by reference to Figs. 1, 2, and 3 that the clearer-rod has an arm, v, secured to it, which is adjustably attached to the rear looped end of an arm, v', secured upon and extending back of the axle A.

It will also be observed that the hand-lever H' has pivoted to it a hook, t, having an arm projecting from it. This hook is intended to engage with a plate, t', fast on the left-hand thill, and to securely lock the said lever and hold the rake in working position.

Having thus fully described our invention, what we claim as new, and desire to secure by Letters Patent, is—

1. In a combined hay rake and tedder, the combination of a frame mounted upon driving-wheels, an endwise-movable tappet-shaft, gearing for rotating this tappet-shaft, a rake-shaft, oscillating rake-sections journaled upon this rake-shaft and provided with rearwardly-extending rake-teeth, tappets upon the said tappet-shaft for oscillating these rake-sections, an endwise-movable rod, H, provided with hooks adapted to engage the said rake-teeth, a pivoted lever, G', connecting the rod H and the tappet-shaft, and a hand-lever for operating this lever G', substantially as described.

2. The combination of the frame of the machine mounted upon driving-wheels, a spur-wheel, a, upon one of the driving-wheels, an endwise-movable tappet-bearing shaft, C, provided with a pinion, $a'$, adapted to engage the said spur-wheel $a$, a transverse rake-shaft, E, mounted in bearings on the frame and provided with arms G, rake-teeth pivoted upon said shaft E and adapted to be operated by the tappets upon the shaft C, an endwise-movable rod, H, mounted in bearings in the arms G on the shaft E, and provided with hooks adapted to engage the said rake-teeth, a pivoted lever, $G'$, connecting the shaft C and rod H, and a lever for operating this connecting-lever, substantially as described.

3. In a combined hay rake and tedder, the combination of the frame mounted upon driving-wheels, an endwise-movable tappet-shaft provided with tappets, gearing for rotating this tappet-shaft, a rake-shaft, oscillating rake-sections upon this rake-shaft, these sections being adapted to be oscillated by the tappets upon the tappet-shaft, rake-teeth secured to these rake-sections, an endwise-movable rod, H, provided with hooks adapted to engage the said rake-teeth, a pivoted lever, $G'$, connecting the endwise-movable rod H with the endwise-movable tappet-shaft, the rear end of this lever being bifurcated, a curved arm, $i$, secured to the endwise-movable rod H and engaging with the rear bifurcated end of the lever $G'$, a hand-lever for operating the lever $G'$, and a lever connected to the rod H for raising or lowering the rake-teeth, substantially as described.

In testimony whereof we affix our signatures in presence of two witnesses.

ISRAEL L. LANDIS.
    ALBERT ISKE.

Witnesses:
  JAS B. DONNELLY,
  P. DONNELLY.